(12) United States Patent
Legarth

(10) Patent No.: US 10,098,369 B2
(45) Date of Patent: Oct. 16, 2018

(54) HOMOFERMENTED PRODUCTS

(71) Applicant: Lone Legarth, Bække (DK)

(72) Inventor: Jens Høffner Legarth, Bække (DK)

(73) Assignee: Lone Legarth, Baekke (DK)

( * ) Notice: Subject to any disclaimer, the term of this patent is extended or adjusted under 35 U.S.C. 154(b) by 356 days.

(21) Appl. No.: 14/932,823

(22) Filed: Nov. 4, 2015

(65) Prior Publication Data

US 2016/0165924 A1 Jun. 16, 2016

Related U.S. Application Data

(63) Continuation of application No. 13/797,718, filed on Mar. 12, 2013, which is a continuation of application (Continued)

(30) Foreign Application Priority Data

Jul. 14, 2006 (DK) .................................. 2006 00984

(51) Int. Cl.
  *A23K 3/03* (2006.01)
  *A23K 10/00* (2016.01)
  (Continued)

(52) U.S. Cl.
  CPC .............. *A23K 10/00* (2016.05); *A23K 1/007* (2013.01); *A23K 1/009* (2013.01); *A23K 1/08* (2013.01);
  (Continued)

(58) Field of Classification Search
  CPC ........ A23K 10/00; A23K 10/30; A23K 10/37; A23K 10/28; A23K 10/18; A23K 10/12;
  (Continued)

(56) References Cited

U.S. PATENT DOCUMENTS 3,459,554 A 8/1969 Shogo et al.
3,840,670 A 10/1974 Holt
(Continued)

FOREIGN PATENT DOCUMENTS

CN 1409986 A 4/2003
DE 101 50 758 A1 4/2003
(Continued)

OTHER PUBLICATIONS

"Advantages of controlled fermented liquid feed" Pig Progress, 2005, pp. 14-16, vol. 21, No. 5.
(Continued)

*Primary Examiner* — Felicia C Turner
(74) *Attorney, Agent, or Firm* — Sean D. Detweiler, Esq.; Morse, Barnes-Brown & Pendleton, P.C.

(57) ABSTRACT

The present invention pertains to the field of liquid feed, and relates to fermented feed products, methods for their preparation, as well as uses thereof. Furthermore, the invention further relates to animal liquid feed and methods of preparing liquid feed using lactic acid bacteria. In particular, a method of preparing a fermented mixed feed is provided, comprising the steps of: (a) providing a liquid fermented product; (b) providing a feed product to be fermented; (c) combining the products from step (a) and (b), and fermenting the feed product of step (b) using the liquid fermented product of step (a) as inoculum.

13 Claims, 9 Drawing Sheets

Related U.S. Application Data

No. 12/304,826, filed as application No. PCT/DK2007/050096 on Jul. 13, 2007.

(51) Int. Cl.

| | | |
|---|---|---|
| *A23K 10/12* | (2016.01) | |
| *A23K 10/18* | (2016.01) | |
| *A23K 10/28* | (2016.01) | |
| *A23K 10/30* | (2016.01) | |
| *A23K 10/37* | (2016.01) | |
| *A23K 50/30* | (2016.01) | |
| *A23K 30/18* | (2016.01) | |
| *A23K 1/00* | (2006.01) | |
| *A23K 1/08* | (2006.01) | |
| *A23K 1/14* | (2006.01) | |
| *A23K 1/18* | (2006.01) | |

(52) U.S. Cl.
CPC ............ *A23K 1/14* (2013.01); *A23K 1/143* (2013.01); *A23K 1/184* (2013.01); *A23K 1/1833* (2013.01); *A23K 10/12* (2016.05); *A23K 10/18* (2016.05); *A23K 10/28* (2016.05); *A23K 10/30* (2016.05); *A23K 10/37* (2016.05); *A23K 30/18* (2016.05); *A23K 50/30* (2016.05); *A23Y 2220/67* (2013.01); *A23Y 2280/15* (2013.01); *A23Y 2280/55* (2013.01); *Y02P 60/875* (2015.11); *Y02P 60/877* (2015.11)

(58) Field of Classification Search
CPC .... A23K 30/18; A23K 50/30; A23Y 2220/67; A23Y 2280/15; A23Y 2280/55; Y02P 60/875

See application file for complete search history.

(56) References Cited

U.S. PATENT DOCUMENTS

| | | |
|---|---|---|
| 3,857,971 A | 12/1974 | Abdo et al. |
| 3,953,609 A | 4/1976 | Farr |
| 4,018,650 A | 4/1977 | Busta et al. |
| 4,138,498 A | 2/1979 | Das |
| 4,528,199 A | 7/1985 | Moon et al. |
| 4,820,527 A | 4/1989 | Christensen et al. |
| 4,842,871 A | 6/1989 | Hill |
| 4,981,705 A | 1/1991 | Tomes |
| 5,002,778 A | 3/1991 | Grant |
| 5,459,053 A | 10/1995 | Rasmussen |
| 5,529,793 A | 6/1996 | Garner et al. |
| 6,403,084 B1 | 6/2002 | Chan et al. |
| 2002/0054935 A1 | 5/2002 | Yamamoto |

FOREIGN PATENT DOCUMENTS

| | | |
|---|---|---|
| EP | 1 248 536 B1 | 10/2006 |
| EP | 1 838 839 B1 | 7/2011 |
| FR | 2 640 119 A1 | 6/1990 |
| GB | 1 511 975 | 5/1978 |
| JP | 3-61453 A | 3/1991 |
| JP | 3-216158 A | 9/1991 |
| JP | 11-243867 A | 9/1999 |
| JP | 11-318344 A | 11/1999 |
| JP | 2000-125776 A | 5/2000 |
| JP | 2004-41064 A | 2/2004 |
| JP | 2005-261299 A | 9/2005 |
| JP | 2007-82468 A | 4/2007 |
| WO | WO 00/56912 A1 | 9/2000 |
| WO | WO 2001/52668 A2 | 7/2001 |
| WO | WO 2004/071209 A1 | 8/2004 |
| WO | WO 2006/072631 A1 | 7/2006 |

OTHER PUBLICATIONS

"Your are what you eat"—also true in the pigsty, DBU aktuell, Jun. 2006, No. 6.

Flumed-Ferrer, C. et al., "Survival, growth and persistence under farm conditions of a Lactobacillus plantarum strain inoculated into liquid pig feed" Journal of Applied Microbiology, 2005, pp. 851-858, vol. 99.

"Lactic Acid Bacteria" The Biochemistry of Silage, Second Edition, 1991, pp. 82-83.

Abschlussbericht Projekt BYFERM "Entwicklung einer Anlage zur Fermentation von Nebenprodukten als Komponenten für flüssiges Schweinefutter" Jun. 2001-May 2004.

Plumed-Ferrer, C., et al. "Survival, growth and persistence under farm conditions of a Lactobacillus plantarum strain inoculated into liquid pig feed." *Journal of Applied Microbiology* 99.4 (2005): 851-858.

HOMOFERMENTED PRODUCTS

CROSS-REFERENCE TO RELATED APPLICATIONS

This application is a continuation of U.S. patent application Ser. No. 13/797,718, filed on Mar. 12, 2013, which is a continuation of U.S. patent application Ser. No. 12/304,826, filed on Mar. 12, 2009, which is a U.S. National Phase of PCT International Application Number PCT/DK2007/050096, filed on Jul. 13, 2007, designating the United States of America and published in the English language, which is an International Application of and claims the benefit of priority to Danish Patent Application No. PA 2006 00984, filed on Jul. 14, 2006. The disclosures of the above-referenced application are hereby expressly incorporated by reference in their entireties.

TECHNICAL FIELD OF THE INVENTION

The present invention pertains to the field of liquid feed. More particularly, the present relates to providing fermented feed products, methods for their preparation as well as uses thereof.

BACKGROUND OF THE INVENTION

In the farming industry, feed is often delivered to the animals by liquid feeding systems. This causes several problems. Potential harmful bacteria and organisms are natural inhabitants of soil and vegetation and are accordingly found on feed components and everywhere in the animal's surroundings. The bacteria and other organisms present will ferment, unless prevented e.g. by sterilization. The fermentation may result in outgrow of pathogenic bacteria e.g. *Vibrio* spp., *Campylobacter* spp., *Salmonella* spp., *E. coli*, and *Stapholococcus aureus*. Furthermore, there might be a high content of various types of yeast and molds. This uncontrolled growth in the liquid feed may result in illness, malnutrition, diarrhea, or even death of the animals. Furthermore, animals infected with *Campylobacter* spp. or *Salmonella* spp. may transfer the infection to humans, and therefore it is desirable to avoid such infections in animals.

Production of a fermented mixed feed in an environment with high microbial pressure, including pathogenic microorganisms is very challenging, and many attempts have failed so far. Generally, conventional inoculation of feed with starter cultures requires cultivation and propagation steps, including a sterile handling of bacteria. This is highly challenging for a farmer, who is not trained in general microbiological skills, and who is surrounded by an environment of high microbial pressure, such as found in conventional feeding kitchens in a pig farm. The alternative, a "continuous" fermentation, where a portion of the fermented feed is used as inoculum for a new fermentation batch, suffers from gradual increase of undesired microorganisms, such as acid tolerant yeasts. These are not only known to have a detrimental effect on the fermented feed, but they can be very difficult to get rid off, especially in the feeding pipes.

It has proven very difficult, if not impossible, to avoid the above-mentioned problems if liquid feed is to be used as feed. Accordingly, the use of dry feed is often the alternative choice.

Until recently, antibiotic-based growth promoters were provided to e.g. pigs on a routine basis, in order to prevent e.g. diarrhea, and thereby to increase weight gain (hence the term "growth promoter"). The use of antibiotic-based growth promoters by farmers has been banned in several countries, including EU. This is in part caused by the fear of generating multi-resistant pathogenic microorganisms. However, use of antibiotics has not stopped, and veterinarians prescribe antibiotics for treatment of large numbers of pigs every day.

By the present invention, the above-mentioned problems have been solved. Furthermore, the invention provides a non-antibiotic growth promoter.

SUMMARY OF THE INVENTION

In one aspect, the present invention relates to a method of preparing a fermented mixed feed, comprising the steps of: (a) providing a liquid fermented product; (b) providing a feed product to be fermented; (c) combining the products from step (a) and (b), and fermenting the feed product of step (b) using the liquid fermented product of step (a) as inoculum.

Another aspect of the invention concerns a fermented mixed feed, provided by a method comprising the steps of: (a) providing a liquid fermented product; (b) providing a feed product to be fermented; (c) combining the products from step (a) and (b), and fermenting the feed product of step (b) using the liquid fermented product of step (a) as inoculum.

A further aspect of the invention pertains to the use of a fermented mixed feed for feeding animals, said fermented mixed feed being provided by a method comprising the steps of: (a) providing a liquid fermented product; (b) providing a feed product to be fermented; (c) combining the products from step (a) and (b), and fermenting the feed product of step (b) using the liquid fermented product of step (a) as inoculum.

A further aspect of the invention relates to fermented products which can be obtained by fermenting a fluid product with lactic acid-producing bacteria capable of producing sufficient lactic acid to decrease the pH to at least 4.2 within 24 hours.

In a further aspect, the invention relates to silage, its preparation and use.

In a further aspect, the present invention relates to uses of the fermented products according to the invention either directly as liquid feed or for preparing liquid feed.

In a further aspect, the present invention relates to a method for preparing a fermented product and its use as growth promoter. The method comprises: (a) providing a fluid product; (b) providing lactic acid-producing bacteria capable of producing sufficient lactic acid to decrease the pH to at least 4.2 within 24 hours; (c) bringing (a) and (b) together; and (d) allowing fermentation to take place under suitable conditions to obtain said fermented product.

In a further aspect, the present invention relates to a method of preparing a liquid feed comprising (a) providing a fermented product according the present invention; (b) providing a feed product to be fermented; and (c) allowing fermentation to take place under suitable conditions.

DETAILED DESCRIPTION OF THE INVENTION

Figure 1:
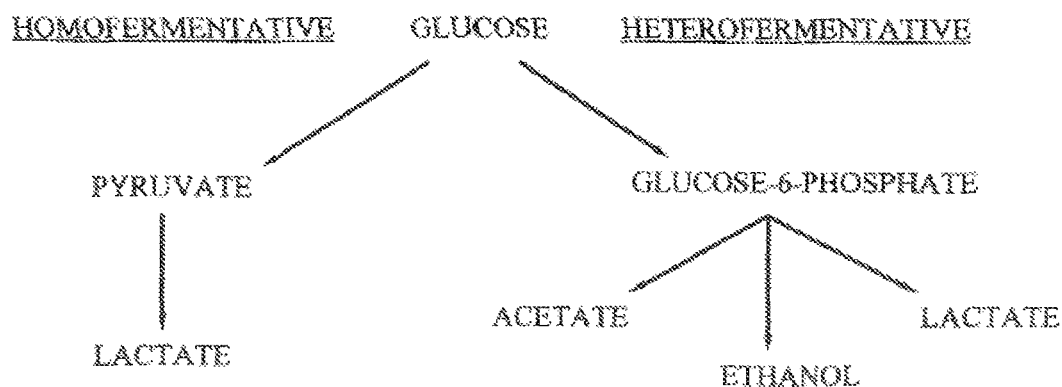
FIG. 1 shows the homofermentative process as compared to the heterofermentative process.
Figure 2:
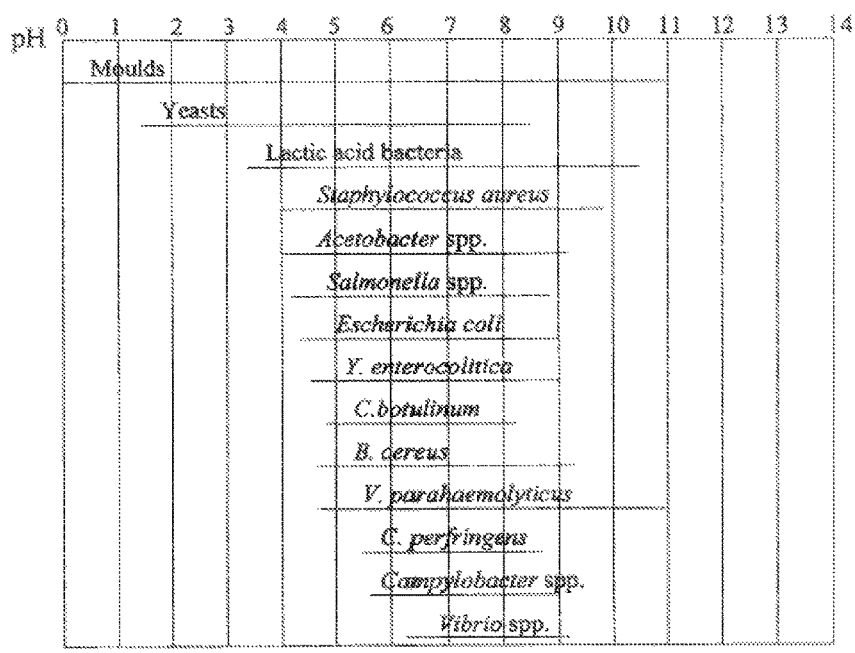
FIG. 2 shows at which pH lactic acid-producing bacteria is active and at which pH some of the unwanted bacteria is able to grow.
Figure 3:
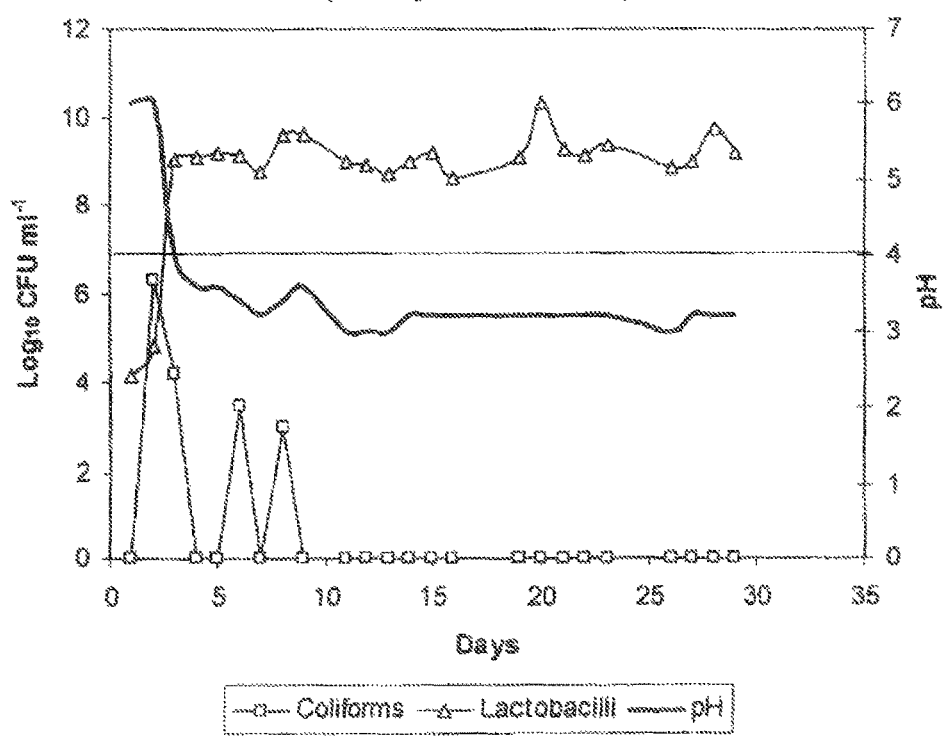
FIG. 3 is a schematic presentation of a well-controlled natural fermentation process.
Figure 4:
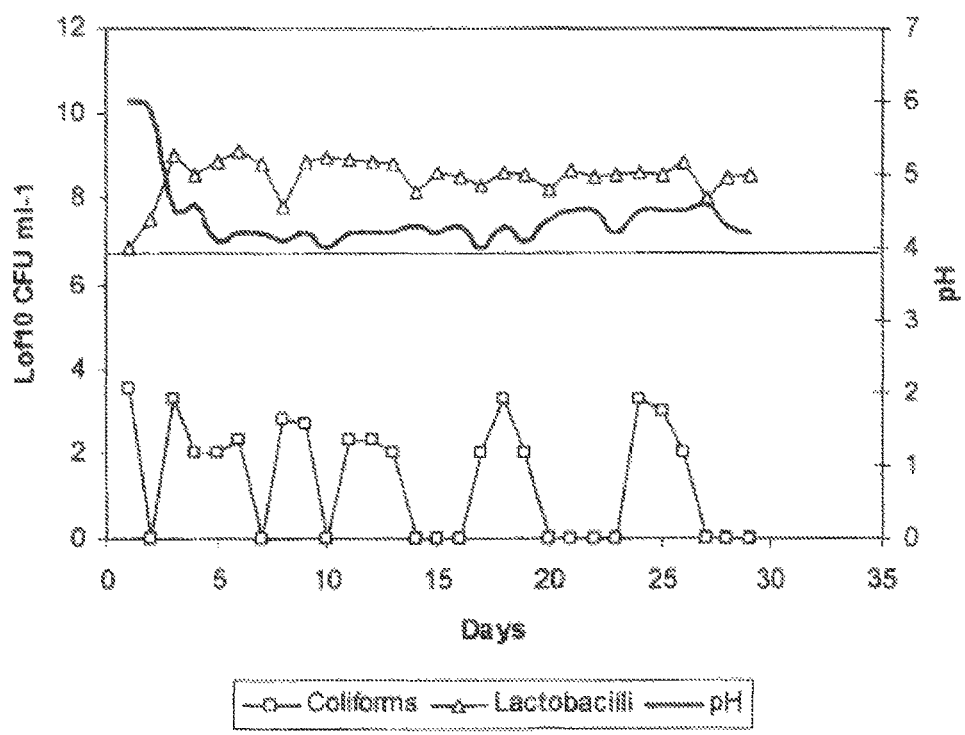
FIG. 4 is a schematic presentation of a poorly controlled natural fermentation process.
Figure 5:
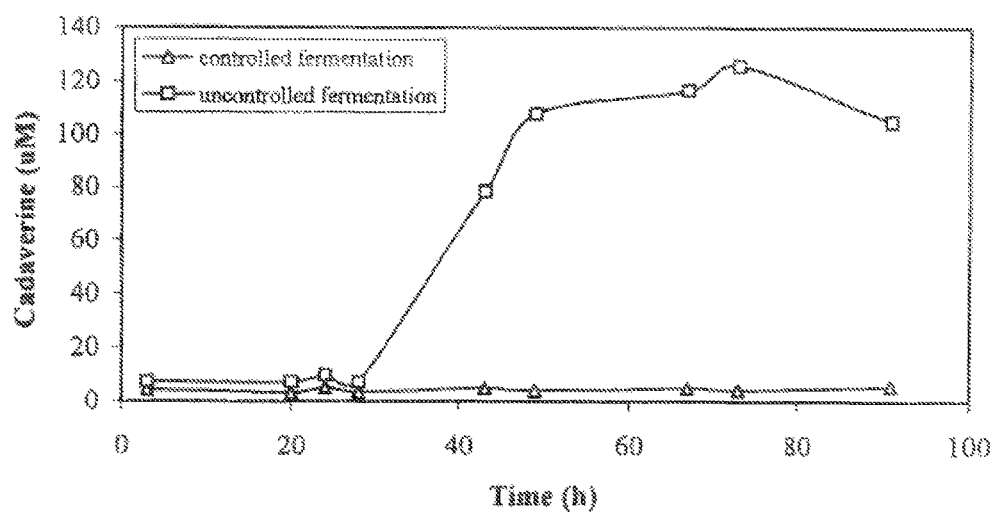
FIG. 5 shows the effect on the cadaverine production (rotting process), depending on whether the fermentation process is controlled or not.

Preparation of liquid feed involves a fermentation or ensiling process. In general, two types of fermentation processes can take place, namely "heterofermentation" by which the fermentation results in the formation of lactic acid, acetic acid, butyric acid, yeast and ethanol, and "homofermentation" by which the fermentation results in the formation of lactic acid.

Thus, it is an object of the present invention to control the fermentation process by ensuring that homofermentation is primarily taking place and by ensuring that the growth of unwanted bacteria, yeast, molds, fungi and lactic acid-producing bacteria are controlled or outcompeted.

It is well-known that different acids and yeasts have different tastes, some of which the animals may like and some which they dislike.

Thus, it is a further object of the present invention to ensure the correct components are present and that such components are present in a suitable ratio resulting in higher palatability.

The lactic acid bacteria according to the invention are capable of producing lactic acid and decreasing the pH during fermentation to at least 4.2 within 24 hours. In one embodiment, the lactic acid-production should take place within 15 hours.

In one embodiment, the pH is from within 3.5 to 4.2 such as e.g. 3.8.

In one aspect, the present invention relates to a fermented product which is obtainable by fermenting a fluid product with lactic acid-producing bacteria capable of producing sufficient lactic acid to decrease the pH to at least 4.2 within 24 hours. In one embodiment, the pH is between 4.2 and 3.5 such as 3.8. In another embodiment, the desired pH should be reached within 15 hours or less.

In the present context, the terms "fermentation" and "ensiling" is used interchangeably and is intended to have the same meaning.

The terms "fermenter" or "fermentation tank" indicate a container, a tank or the like, in which fermentation takes place. Commonly, one or more mixing devices for mixing the content of the fermenter are provided. However, fermentation or a part of fermentation can also take place outside of a fermenter, such as within a pipe, mixing tank, storage tank and the like.

The terms "tank" or "container" are interchangeable, and indicate a (storage) facility. They can be of silo-type, big-bags, or a storage facility, such as a room or separate compartment.

The terms "fluid product" or "liquid product" are used interchangeably and indicate a product with a moisture content of 20 vol-% or more, in particular 25 vol-% or more. Within the present context, "vol-%" is intended to mean volume percent. Unless indicated differently, % indicates weight %.

In order to be suitable for fermentation according to the invention, a product will commonly have a moisture content of 20 vol-% or more, in particular 25 vol-% or more. In one embodiment of the invention, a sufficient water content (i.e. a water content of 20 vol-% or more) is provided by mixing a product with an insufficient water content (i.e. a water content of below 20-vol %), with a product with a sufficient water content, in order to provide an appropriate water content of the mixture. In a further embodiment, a combination of mixing products with different water contents combined with addition of water or a water-based fluid provides a mixture with appropriate water content for fermentation.

In another embodiment of the invention, water is added to the feed product to be fermented, if the moisture content is too low for efficient fermentation.

Optionally, the water can be treated, and can comprise chemical compounds and chemical compositions, such as salts, minerals, vitamins, buffering substances, organic or inorganic acids and the like. In yet another embodiment, the treated water improves fermentation and/or weight gain in animals.

The term "product" according to the invention is to be understood in its broadest sense. Commonly, the products are food or feed related. "Product(s)" and "feed product(s)" may suitably be obtained from the dairy industry, the agricultural industry, the wine industry, the spirit industry, or beer industry, or combinations thereof. Examples of suitable "products" and "feed products" comprise one or more of mature and/or immature plants and parts thereof, such cereals, e.g. wheat, barley, rye, rice, maize (cob maize silage (CCM) or ripe), triticale, oat; vegetables (e.g. potatoes, beans, peas, maize, soy; whey, curd, skim milk and the like.

"By-products" or "waste products" are terms used to describe mostly undesired products deriving from industrial processes, which may be available at low costs, or for free. Commonly, they are not used directly as feed for animals, and long time storage may be an issue due to decomposition and uncontrolled fermentation and spoilage. Examples of such "by-products" and/or "waste products" comprise whey, spent grain (from brewing, wine or bio-ethanol industry), plant or parts thereof, potatoes, plants, yeast, bacteria, fungi and the like.

The terms "fermented product" or "fermented feed" indicate any product or feed that has been fermented or is in the process of being fermented.

"Liquid fermented product" indicates that the fermented product has a water/moisture content of more than 20%. In the context of the present invention, it is used as inoculum for fermentation. It can also be fed to animals directly, or in combination with another fermented or non-fermented feed, composition or product.

"Silage" or "ensilage" are used interchangeably and refer to a fermented plant product to be fed to animals, commonly ruminant animals like cattle and sheep. Silage is fermented and stored, a process called ensilage. Usually, fermentation occurs via the natural microbial flora present on the plant product to be fermented. Thereby, a variety of different fermentation products can occur, including acetic acid. The fermentation process can take days, weeks or month, and the resulting fermented product, the silage or ensilage can be stored for many months. Silage is most often prepared from grass crops, including maize or sorghum. Silage is often made from the entire plant, usually excluding the roots, and not just the grain. Generally, the plant is cut into pieces, often directly during harvesting. Silage can also be made from many other field crops, and sometimes a mixture is used, such as oats and peas. Haylage is a term used to describe ensiled forages, made up of grass, alfalfa and alfalfa/grass mixes and the like. It is used for example to feed dairy. Instead of fermenting in a silo, baylage is another form of silage. In this case, for example the plant or parts thereof is cut and baled while still fairly wet, and often too wet to be baled and stored as hay. The dry matter can be around 60 to 70%. The bales are wrapped tightly in plastic wrappers, wherein fermentation occurs.

The term "fermented mixed feed" indicates a feed product that is in the process of or that has been fermented according to the invention by the use of a liquid fermented product as inoculum. Additional components, e.g. minerals, vitamins, amino acids, non fermented feed and the like, may be present as well.

The term "animal(s)" as used herein is intended to include mammals such as pigs, piglets, cattle, and horses, poultry such as chickens, turkeys, hens, geese and ducks, and fish such as salmon and trout. Monogastric animals, such as humans, pigs, horses, dogs, and cats, have a simple single chambered stomach. In contrast, ruminant animals or ruminants have a multi-chambered complex stomach. Ruminants digests their food in two steps, first by eating the raw material and regurgitating a semi-digested form known as cud, then eating (chewing) the cud, a process called ruminating. Ruminants include for example cattle, goats, sheep and deer.

The term "growth promoter" indicates a compound or product which is provided to an animal in order to improve its growth or weight gain. This includes addition of antibiotics to the feed, either prescribed by a veterinarian or added prophylactically by a farmer. On the other hand, a fermented mixed feed provided by the invention is also a growth promoter, as it has been shown to be able to increase weight gain of animals compared to a control.

In general, the fermentation takes at a suitable temperature for a suitable amount of time. The temperature should be so as to ensure activity of the lactic acid-producing bacteria, i.e. it should not be below 10° or above 50° C. In one embodiment, the temperature may be about 30°. The fermentation should be continued at least until the pH has reached a suitable level, i.e. 4.2 or less, e.g. 3.5 or 3.8. Thus, fermentation should be continued up to e.g. 24 hours, or 15 hour. Sometimes, fermentation may be completed within 10, 9, 8, 5, 6, 4, 3, or 2 hours or 1 hour, or in certain cases within 30 minutes.

In one aspect, the present invention relates to a method of preparing a fermented mixed feed, comprising the steps of: (a) providing a liquid fermented product; (b) providing a feed product to be fermented; (c) combining the products from step (a) and (b), and fermenting the feed product of step (b) using the liquid fermented product of step (a) as inoculum. In one embodiment of the invention, the fermented mixed feed has a pH below 4.2. In another embodiment, the pH is between 4.2 and 3.5. In a further embodiment, the pH of the fermented mixed feed is around 3.8.

Lactic acid bacteria produce lactic acid during fermentation of a fermentable carbon source, which results in acidification of the environment. Depending on the starter culture or starter cultures used, as well as on the availability of fermentable sugar(s), a fermented mixed feed is provided according to the invention, said fermented feed possesses a lactic acid concentration above 50 mM. In another embodiment, lactic acid concentration exceeds 100 mM. In a further embodiment, the lactic acid concentration lactic exceeds 150 mM or 200 mM. In yet another embodiment, lactic acid concentrations of above 250 mM or above 300 mM are provided in the fermented product.

The lactic acid concentration in the liquid fermented product, by-product or waste product used as inoculum for the fermentation according to the invention can be higher than the lactic acid concentration in the fermented mixed feed. In another embodiment of the invention, the lactic acid concentration in the fermented mixed feed is higher than in the liquid fermented (by-)product. In a further embodiment, the lactic acid concentrations of inoculum and fermented product are approximately the same.

Likewise, pH of incoculum and fermented (mixed) product can be the same, similar or different. In one embodiment of the invention, the pH of the liquid fermented product used as inoculum is below 4.2. In another embodiment, the pH is between 4.2 and 3.5. In a further embodiment, the pH is around 3.8.

According to the invention, a fermented mixed feed can be produced within 1 day, or within 12-24 h. In another embodiment, the fermented product can be produced between 8-12 h, or 6-8 h. In a further embodiment, the fermentation is achieved between 4-6 h, or below 4 h.

In another aspect of the invention, fermentation can be slower, and can take one or more days, several days, one week, several weeks, one month, or several months. Fermentation can be controlled by adding a fermented liquid product or a mixed fermented feed as inoculum comprising active lactic acid bacteria. The proportion of inoculum to feed product to be fermented can be in the range of 0.1-10 vol-%, or 0.5-5 vol-%, or 1-2.5%, or around 1-2 vol-%. The fermentation process can take place in a closed silo. In another embodiment of the invention, fermentation occurs in bales tightly wrapped in plastic wrappers. In one particular embodiment of the invention, ensilage is based on fermented CCM maize. The resulting ensilage can be used to feed monogastric animals. In a further embodiment, CCM maize silage is suitable for feeding pigs. In yet another embodiment, CCM maize silage can be used as growth promoter for feeding monogastric animals, such as pigs. The CCM maize based ensilage can be low in acetic acid. In one embodiment of the invention, the concentration of acetic acid is 20 mM or lower, or 15 mM or lower, or 10 mM or lower, or 5 mM or lower. In a further embodiment of the invention, lactic acid content is 50 mM or more, 100 mM or more, 150 mM or more, 200 mM or more, 250 mM or more, or above 300 mM.

Fermentations according to the invention can be performed at different temperature ranges. Commonly, fermentation is performed at a temperature between 5° C. and 50° C., or between 15° C. 40° C. In another embodiment of the invention, fermentation temperature is between 18 and 30° C. In a further embodiment of the invention, fermentation is conducted at or around room temperature, such as 20-25° C., or 22-24° C. or around 23° C. In yet another embodiment of the invention, means for monitoring and controlling temperature are provided. In yet a further embodiment of the invention, the temperature of the water added for providing an appropriate water content of the fermentation broth is essentially controlling fermentation temperature. Fermentation temperature can be constant, or it may vary.

Suitable fermenters according to the invention can be provided with mixing means, often provided as standard equipment from the manufacturer.

Commonly, they will be operated at approximately 1-500 rpm. In one embodiment of the invention, mixing speed is 10-300 rpm. In another embodiment of the invention, the mixing means is operated between 20 and 100 rpm. In a further embodiment, the mixing device operates at around 35 rpm.

According to the invention, a product to be fermented is combined with a liquid fermented product comprising (active) lactic acid bacteria. This inoculum can be present in a range of 0.1 to 99.9 vol-%, or 1 to 99 vol-%, or 5 to 70 vol-%. In another embodiment of the invention, the inoculum is around 0.5-1, 1, 1-5, 5, 5-10, 10, 10-20, 20, 20-30, 30, 30-40, 40, 40-50 or 50 vol-%. In a further embodiment, the liquid fermented product comprises 25 to 35 vol-%. In yet another embodiment, the inoculum comprises around 30 vol-%.

The fermentation process provided by the starter culture according to the invention is essentially a homofermentative process (FIG. 1). "Essentially homofermentative" means, that the predominant bacterial flora driving the fermentation is homofermentative. In one embodiment, 99% or more of the bacteria are homofermentative. In another embodiment of the invention, 95% or more of the bacteria are homofermentative. In yet another embodiment, 90% or more of the bacteria are homofermentative. "Essentially homofermentative" indicates also that the major fermentation product is lactic acid, and the levels of acetic acid and ethanol are either below taste threshold, around taste threshold or slightly above taste threshold. Alternatively, "essentially homofermentative" indicates a ratio of lactic acid to acetic acid or lactic acid to ethanol (mlWmM) of 10:1 or more, 20:1 or more, 50:1 or more, or 100:1 or more. According to the invention, both fermentations are essentially homofermentative, i.e. fermentation of the fermented (by-) product as well fermentation of the feed product (barley, wheat, soy etc.). In another embodiment of the invention, the fermentation process is a heterofermentative process (FIG. 1). In a further embodiment of the invention, the starter culture comprises homo- and heterofermentative lactic acid bacteria. In yet another embodiment of the invention, the starter culture comprises non-lactic acid bacteria.

According to the invention, fermentations comprise lactic acid-producing bacteria. Thus, in the broadest aspect, the present invention relates to lactic acid-producing bacteria. The lactic acid bacteria comprise a clade of Gram positive, low-GC, acid tolerant, non-sporulating, non-respiring rod or cocci that are associated by their common metabolic and physiological characteristics. These bacteria, usually found in decomposing plants and lactic products produce lactic acid as the major metabolic end product of carbohydrate fermentation. This trait has historically linked lactic acid bacteria with food fermentations as acidification inhibits the growth of spoilage agents. Proteinaceous bacteriocins are produced by several lactic acid bacteria strains and provide an additional hurdle for spoilage and pathogenic microorganisms. Furthermore, lactic acid and other metabolic products contribute to the organoleptic and textural profile of a food item. The industrial importance of the lactic acid bacteria is further evidenced by their generally regarded as safe (GRAS) status, due to their ubiquitous appearance in food and their contribution to the healthy microflora of human mucosal surfaces. The genera that comprise the lactic acid bacteria are *Lactobacillus, Leuconostoc, Pediococcus, Lactococcus*, and *Streptococcus, Aerococcus, Carnobacterium, Enterococcus, Oenococcus, Teragenococcus, Vagococcus*, and *Weisella*; these genera belong to the order Lactobacillales.

In the present invention, the lactic acid-producing bacteria used for fermentation are mainly and non-exclusively lactic acid bacteria of the genus *Enterococcus, Lactobacillus, Pediococcus* or *Lactococcus*, or combinations thereof. A starter culture or inoculum according to the invention can also comprise lactic acid bacteria selected from the group consisting of one or more *Enterococcus* spp., *Lactobacillus* spp., *Lactococcus* spp., and *Pediococcus* spp. In another embodiment of the invention, the lactic acid bacteria are selected from the group consisting of one or more one *Enterococcus faecium, Lactobacillus rhamnosus, Lactobacillus plantarum, Pediococcus acidililactili*, and *Pediococcus pentosaceus*. In further embodiment, the lactic acid producing bacteria are of the order Lactobacillales. The lactic acid-producing bacteria can also be selected from *Lactobacillus* spp., *Pediococcus* spp., *Enterococcus* spp., and *Lactococcus* spp. or a combination thereof. In yet another embodiment, the lactic acid-producing bacteria comprise *Pediococcus pentosaceus, Pendiococcus acidilactici* and *Lactobacillus plantarum, Lactobacillus rhamnosus*, and *Enterococcus faecium*, or a combination thereof. In still another embodiment, the lactic acid bacteria comprise *Enterococcus faecium* and/or *Lactobacillus rhamnosus*. In a further embodiment, the lactic acid bacteria comprise one or more of *Enterococcus faecium* MCIMB 30122, *Lactobacillus rhamnosus* NCIMB 30121, *Pediococcus pentosaceus* HTS (LMG P-22549), *Pendiococcus acidilactici* NCIMB 30086 and/or *Lactobacillus plantarum* LSI (NCIMB 30083).

According to one aspect of the invention, a product, by-product or waste product is fermented. Such a product, by-product or waste product may be obtained from various industries, which may or may not be related to feed and/or food production. Suitable industries may comprise food industry, feed industry, dairy industry, agricultural industry, alcohol producing industry, beer industry, wine industry, distilled spirit industry, bio-ethanol industry, meat processing industry, fishing industry, pharmaceutical industry, petrochemical industry, pharmaceutical industry and mining industry.

A product, by-product or waste product can comprise for example whey, curd, spent grain, yeast, fungus, bacteria, mature or immature corn, potato or parts thereof, or vegetables. According to one aspect of the invention, the product to be fermented is a product that failed to meet one or more production specifications.

Feed products according to the invention can comprise grain (ripe or unripe), such as barley, wheat, rye, oat, maize, rice, beans, peas, sorghum, triticale and/or soy.

Another aspect of the invention concerns the provision of a fermented mixed feed using the method or methods presented above. Such a fermented mixed feed can be provided by fermenting feeding stuff, such as cereals (mature or immature), ripe or unripe barley, wheat, rye, oat, maize, rice, beans, peas, sorghum, triticale and/or soy. Commonly, the feed to be fermented comprises a mixture of several crops. This feed is also different according to the animals to be fed, as well as their age. Furthermore, economic considerations are also taken into account. Common cereals lack sufficient levels of essential amino acids, such as methionine and lysine. Soy is richer in these essential amino acids, but it is also more expensive. According to one embodiment of the invention the feed to be fermented comprises a mixture of barley and wheat. In another embodiment, the mixture comprises soy, barley, and wheat. In a further embodiment the feed comprises maize and soy. In yet another embodiment, the mixture comprises barley and peas.

Another aspect of the invention relates to the use of a liquid fermented feed, provided as described above, for feeding animals. According to one embodiment of the invention, the animal is a mono-gastric animal. According to a further embodiment, the animal is a pig.

A further aspect of the invention relates to the use of a liquid fermented feed as growth promoter. According to one aspect of the invention, the animal is a Pig—In another aspect, the present invention relates to the use of a fermented product as described herein directly as liquid feed or in mixture with other components such as feed products and fluids to prepare a liquid feed.

In still another aspect, the present invention relates to a method for preparing a fermented product comprising
(a) providing a fluid product,
(b) providing lactic acid-producing bacteria capable of producing sufficient lactic acid to decrease the pH to at least 4.2 within 24 hours,
(c) bringing (a) and (b) together, and
(d) allowing fermentation to take place under suitable conditions.

In one embodiment of such method, the pH is between 4.2 and 3.5. In another embodiment, the pH is 3.8.

In one embodiment of the present method, the fluid product is obtained from the dairy industry, the agricultural industry, the wine industry, the spirit industry, or beer industry, or combinations thereof. In one embodiment, the fluid product is whey, maize, CCM (cob maize silage) and unripe corn, and combinations thereof.

In one embodiment of the method of the present invention, the lactic acid-producing bacteria is selected from *Lactobacillus* spp., *Pediococcus* spp., and *Lactococci* spp. and combinations thereof.

In a special embodiment of the method of the invention, the method further comprises the addition of another feed product, and fermentation is subsequently allowed to take place under suitable conditions.

In yet another aspect, the present invention relates to a method of preparing a liquid feed comprising
(a) providing a liquid product according to the present invention,
(b) providing a feed product to be fermented, and
(c) allowing fermentation to take place under suitable conditions.

In one embodiment of the method, the liquid product is present (or added) in a concentration of 1 vol-% or more, such as for example 1-2 vol-%, or 1-5 vol-%. In another embodiment, the liquid product is added in more than 5 vol-%. In one embodiment of the method of the present invention, the feed product is selected from the dairy industry, the agricultural industry, the wine industry, the spirit industry, or beer industry, or combinations thereof. Examples are corn, maize, beans, soy and mixtures thereof.

It has surprisingly been found that the invention results in a number of advantages, including better preservation of the feed, improved health of the animals resulting in decreased need of antibiotic-based growth promoters and medicaments, improved palatability of the liquid feed, the possibility of using other types of liquid feed, cheaper feed and a positive influence on the animal's environment.

In accordance with the present invention, the fermented product may be fed directly to the animals (with or without further prior processing), or it may be used for further fermentation of liquid feed. In the latter case, the fermented product should constitute 1 vol-% or more relative to the total amount of feed. In another embodiment, the fermented product constitutes 5 vol-%.

The present invention is based on the recognition that the lactic acid-producing bacteria should be able to produce lactic acid fast enough and in sufficient amount to out compete the natural fermentation which will take place due to natural occurrence of bacteria including pathogenic bacteria and lactic acid-producing bacteria, yeasts and molds. It is recognized that, although many pathogenic bacteria are not able to grow at a pH lower than 4, this does not happen if the production of lactic acid by the lactic acid-producing bacteria takes place quickly and efficiently. Furthermore, most yeasts and molds are indeed able to grow under very acetic conditions, however, it has been recognized that quick and efficient production of lactic acid by the lactic acid-producing bacteria cause very reduced or even eliminated growth of such yeasts and molds.

It is believed that the fermented product according to the present invention may be prepared from any type of fluid product since the fermentation is strongly influenced by the choice of lactic acid-producing bacteria. Likewise, the fermented product of the invention may be used for the further fermentation of any other type of feed product. Due to the advantageous properties of the fermented product of the invention, the further fermentation will result in a well-controlled further fermentation, leading to a safe and tasty product, which furthermore has a higher nutritive value and higher vitamin content. Furthermore, feeding the animals with products of the present invention may reduce the risk of infection with *Campylobacter* and *Salmonella* spp. and thus the present invention adds to the human food safety.

When water or another fluid like e.g. whey or skim milk is added during the fermentation process, it may advantageously be treated so as to remove or at least reduce components of the water which have buffer capacity. In particular, the content of calcium, zinc, manganese and/or iron may be reduced or removed. This is believed, in some instances, to facilitate the effective production of lactic acid by the lactic acid-producing bacteria due to the reduce buffer capacity.

As mentioned above, pathogenic bacteria are a natural inhabitant of the animal's surroundings, and they grow in the environment, and add to the so-called "bacterial pressure", or "microbial pressure". Both expressions are used interchangeably, and include any microorganisms, such as bacteria, yeast, fungi, amoebae, spores, phages, single-cell organisms and the like. In accordance with the present invention, it has surprisingly been observed that feeding the animals with the fermented product of the present invention, the animal's environment is modified positively.

Sometimes it is desired to initiate the fermentation under sterile conditions. This may e.g. be the case when the bacterial pressure of the environment is high. However, usually lactic acid-producing bacteria, growth medium and fluid are provided together as a pre-mixed solution. A serious drawback of this system is that fermentation is already taking place, and thus the bacteria of the surroundings may outcompete the lactic acid-producing bacteria of the pre-mixed solution almost immediately. Furthermore, such pre-mixed solution is difficult to ship to the customer, and it must be used within a limited period of time after it has been shipped, otherwise the bacteria cultures will die when the growth medium is used up.

By the present invention, the problems of initiating sterile initiation of fermentation have been solved.

Thus, in an additional aspect, the present invention relates to a sterile closed package system comprising a container with sterile, inactive lactic acid-producing bacteria, a container with a sterile growth medium for the lactic acid-producing bacteria, and a container with a sterile fluid. In one embodiment of the package system, the lactic acid-producing bacteria have been freeze-dried. In another embodiment, the growth medium comprises vitamins, maltodextrine, and dextrose anhydrose. In another embodiment, further containers may be included.

In another additional aspect, the present invention relates to a method of initiating homofermentation by desired lactic acid-producing bacteria comprising (a) providing a sterile closed package system comprising a container with sterile, inactive lactic acid-producing bacteria, a container with a sterile growth medium for the lactic acid-producing bacteria, and a container with a sterile fluid in a container, (b) bringing the bacteria, the growth medium and the fluid within the sterile closed package system in contact with each other whereby fermentation is initiated, and (c) bringing the content of said sterile package system into contact with the feed product to be fermented.

In one embodiment of the method, the lactic acid-producing bacteria have been freeze-dried.

In yet another additional aspect, the present invention relates to the use of a sterile closed package system as described herein for initiating homofermentation.

The closed packaged system of the invention can be shipped to the site of use. At the site, the individual containers are opened (e.g. by tearing, picking a hole, dissolving one or more of the containers, opening valves, melting, or pressing) allowing the components to be brought into contact with each other under sterile conditions.

The advantages of the above method are that a homofermentation process could be initiated without concerns about bacterial interference.

The containers may e.g. be made of a polymeric material e.g. plastics and metal. Subsequently, the containers could be placed side by side in closed package, and the package sealed.

Figure 6:
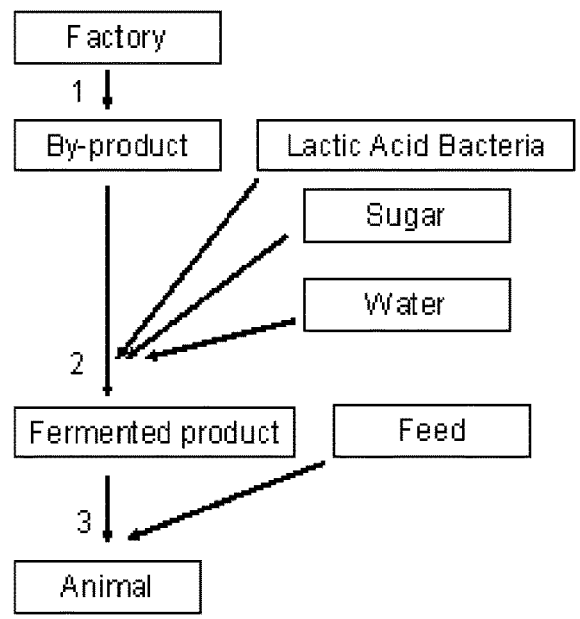
FIG. 6 is a flow diagram, showing the steps of providing animal feed comprising a fermented product or by-product from an industrial process according to an embodiment of the invention.

FIG. 6 is a flow diagram, showing the steps of providing animal feed comprising a fermented product or by-product from an industrial process according to an embodiment of the invention. Often, a by-product, a waste product, or a product not meeting specifications is produced in or during an industrial produces (1). This product, here termed by-product, can be converted (2) to a fermented product, also called liquid fermented feed, by addition of lactic acid bacteria. If required, sugar, carbohydrates or a carbohydrate containing composition can be added in order to promote growth of lactic acid bacteria. Furthermore, water can be added in order to provide an appropriate water content. If needed, additional factors providing suitable fermentation conditions, such as salts, buffers and the like, can be added as well. Fermentation (2) can comprise mixing, stirring and temperature control. Upon fermentation (2), a liquid fermented feed product is obtained. This liquid fermented feed product can be provided to animals as feed (3), either alone, or as supplement together with conventional feed, or supplemented with conventional feed.

In another embodiment of the invention, the product, by-product or waste product to be fermented comprises whey, spent-grain, potatoes (or parts of potatoes (e.g. potato peel)), yeast, bacteria, or fungi, either alone or in any combination. If appropriate, the product to be fermented according to the invention can be modified chemically and/or physically, comprising e.g. treatments with heat, cold, pH, addition of chemical compounds and or compositions, either alone or in any combination. The composition of the product to be fermented may be altered by addition of a further product, e.g. improving nutrition value, fermentability and/or storability of the fermented product. In a further embodiment of the invention, a product which is not a by-product or waste product of an industrial process is converted into a fermented product. Industrial processes according to the invention comprise ethanol production (e.g. beer, wine, bioethanol, distilled spirit and the like), pharmaceutical industry (production of pharmaceutical composition), chemical industry, agricultural and food industry (e.g. dairy, fishing, husbandry, meat processing) and the like.

Figure 7:
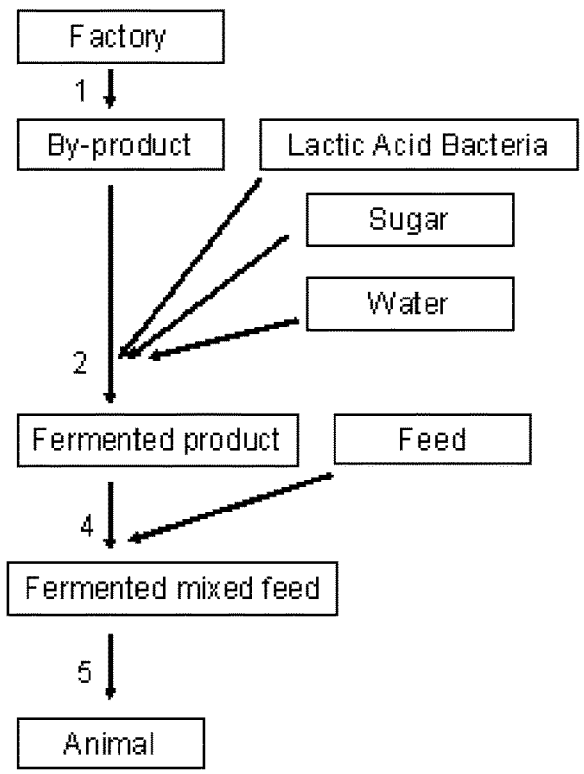
FIG. 7 is a flow diagram, showing the steps of providing a fermented, liquid animal feed according to an embodiment of the invention.

The flow diagram shown in FIG. 7 illustrates the steps of providing a fermented, liquid animal feed according to an embodiment of the invention. Similar to Example 4, FIG. 6, a liquid fermented feed product is obtained. However, instead of feeding the liquid fermented feed product directly to one or more animals as in FIG. 6, the liquid fermented feed product is used to ferment (4) feed to provide a fermented feed product ("fermented mixed feed"). This fermented feed product is the provided (5) to animals as feed, either alone, or as supplement together with conventional feed, or supplemented with conventional feed.

Figure 8:
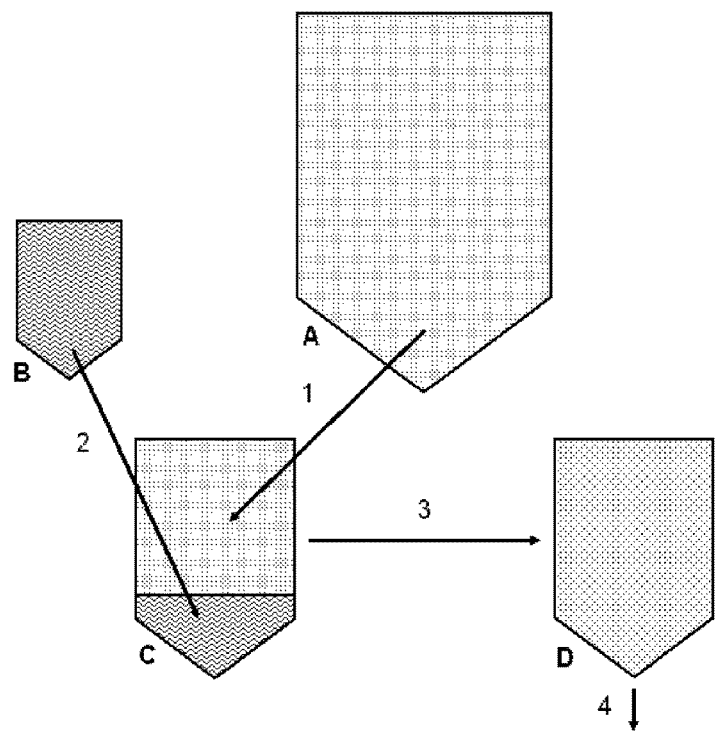
FIG. 8 shows illustrates main components and steps according to an embodiment of the invention.

FIG. 8 illustrates main components and steps according to an embodiment of the invention. A indicates one or more containers comprising feed. The container(s) can comprise different feed, feed components or feed mixtures Furthermore the containter(s) can comprise water or a water based composition. B indicates a container or fermenter comprising the fermented product. C illustrates a fermenter, wherein feed from A is provided, mixed with fermented product from B. D illustrates either the same fermenter as C, after fermentation, or a separate fermentater, in which at least a part of the fermentation of feed occurs. The arrows 1 and 2 indicate providing fermenter C with feed from A and fermented product from B, respectively. Arrow 3 indicates that fermention of product B occurs, and/or transfer of the content or part of the content of C into another fermenter or container. Arrow 4 indicates providing fermented feed D to animals. Means for mixing the products can be provided in A, B, C and/or D.

In one embodiment of the invention, the animals are uniquely or predominantly provided with fermented feed D. In another embodiment, the animals are provided with a mixture of D and another feed, feed component of feed mixture from A. This can be desired, for example for compensating for negative impact of fermentation on some feed ingredients, such as amino acids. It is known that the level of amino acids can be reduced through fermentation, which may not be desirable.

Figure 9:
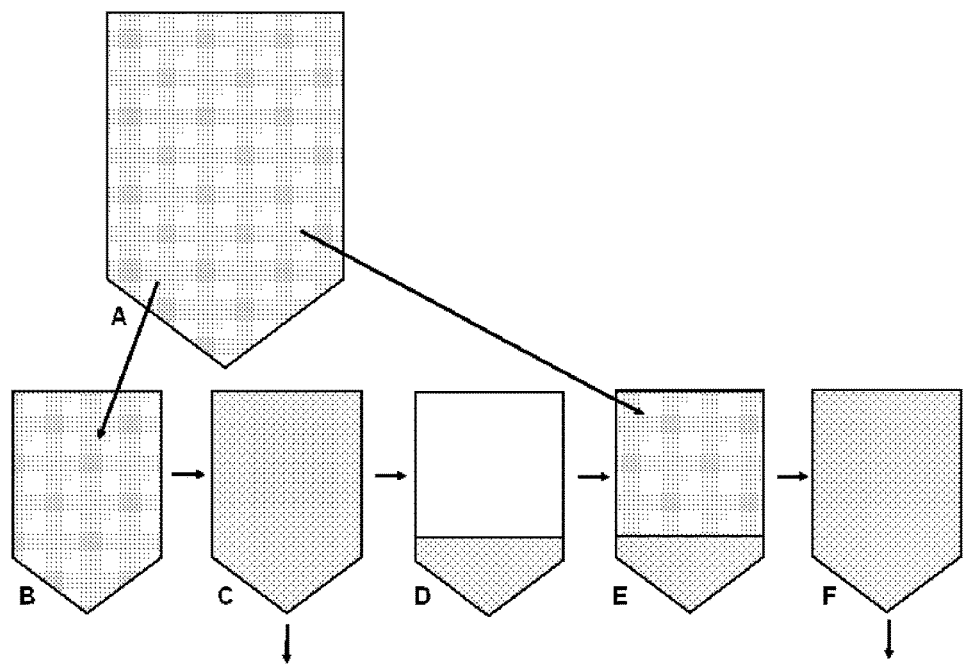
FIG. 9 shows the production of fermented feed according to an alternative embodiment of the invention.

FIG. 9 shows a "continuous" method of producing fermented feed. "A" indicates one or more containers comprising feed. The container(s) can comprise different feed, feed components or feed mixtures. Fermenter B is provided with feed from container(s) A, and fermentation occurs. This fermentation can either occur spontaneously, driven by the microorganisms present in the feed product to be fermented, or by providing a starter culture in order to control the fermentation. C indicates either B during or after fermentation, or another fermenter, in which at least a part of the fermentation takes place. The arrow at the bottom of C indicates providing the fermented feed product to animals. D indicates the fermenter C after a portion of the fermented feed product has been removed, commonly as a result of feeding animals. E indicates that the fermenter D is refilled with feed from A, and F indicates either E during or after fermentation, or another fermenter, in which at least a part of the fermentation takes place. The arrow at the bottom of F indicates providing a portion of the fermented feed product to animals. The cycles D, E F are repeated. These repetitions, or "continuous" fermentation is not desirable, as the quality of the fermented feed product is known to change with time, as the composition of the starter culture in step D will gradually change. This is for example due to the microbial pressure, i.e. the bacteria, yeast and fungi including spores, present in or near the stable, animals, workers, feed kitchen, containers, pipes, machines, water and the like, the microbial flora providing fermentation can change with time. Furthermore, yeast, e.g. acid tolerant yeast, is known to be a problem in "continuous" type fermentations. Although yeast is growing slowly, the levels of yeast may rise from batch to batch. Generally, yeast is undesirable, as it can provide off flavors, which e.g. pigs do not like. Yeast infection is also a very common problem in feeding pipes, which are very difficult, if not virtually impossible to clean. A further potential problem associated with "continuous"-type fermentation is the risk of infections with bacteriophages. This problem is known from dairy industry. Another potential issue is the occurrence of natural mutations, which also can reduce the quality of the fermented product.

The invention, including its benefits, is further illustrated by the following non-limiting examples.

EXAMPLES

Example 1

Preparation of a Fermented Product According to the Present Invention

The present invention was exemplified by mixing 80% wheat and 20% barley in a fermentation tank. In the mixture, grain constituted 28% and water the remaining 72%. Furthermore, 100 parts of Pig Stabilizer 317 (Medipharm) were added per 10 tones of liquid feed soup. The Pig Stabilizer 317 further comprised vitamins, maltodextrine, dextrose anhydrose and a combination of the lactic acid-producing bacteria *Pediococcus pentosaceus, Pediococcus acidilactici* and *Lactobacillus plantarum*. The air intake to the fermentation tank was taken directly from the air in the room wherein the fermentation tank was situated. Samples were sent to a commercial analytical laboratory, and analysis for vinegar and ethanol content indicated that the environment was almost sterile since the analysis only revealed 3 mM of vinegar and no ethanol in the mixture. Furthermore, the level of lactic acid was about 140 mM after 20 hours fermentation. This mixture could thus be considered almost as 100% homofermentative.

In conclusion, it is possible to prepare a fermented product using lactic acid-producing bacteria. Furthermore, it has been demonstrated that fermentation is controlled and takes place in a homofermentative way.

Example 2

Preparation of Feed Products According to the Present Invention

Samples of the fermented product of Example 1 were taken and brought to a liquid feed kitchen where liquid feed had previously failed to be produced due to a high bacterial pressure of the surroundings.
Experiment 1
1 liter of the mixture was mixed with 100 liters of feed product in the fermentation tank in the kitchen. The fermentation process was completed after 9 hours and the pH of the mixture was 3.8.
Experiment 2
In another example, 50 liter of the mixture was mixed with 200 liters of feed product in the fermentation tank in the kitchen. The fermentation process was completed after 5 hours and the pH of the mixture was 3.8.
Experiment 3
In third example 50 liter of the mixture was mixed with 5000 liters of feed product in the fermentation tank in the kitchen. The fermentation process was completed after 9 hours and the pH of the mixture was 3.8.
Results
In all instances, the obtained liquid feed was almost homofermented. Thus, it has been demonstrated that the fermentation process of the present invention has superior advantages since in had previously proved impossible to obtain a homofermented liquid feed. It is indeed possible to control the fermentation even when the bacterial pressure of the surroundings is extremely high.

Example 3

Preparation of Liquid Feed in Feed Kitchens Having Lower Bacterial Pressure

Liquid feeds similar to ones described in Example 2 were prepared in other feed kitchens with a lower bacterial pressure of the surroundings. The fermentation time as compared to the fermentation time in Example 2 varied within 1 hour.

Accordingly, it was demonstrated that the fermentation according to the present invention takes place so quickly and so efficiently that the bacterial pressure does not influence the outcome of the fermentation substantially.

Example 4

Different Set-Ups of Home Mixer Feed Systems (Systems 1-3)

Figure 10:
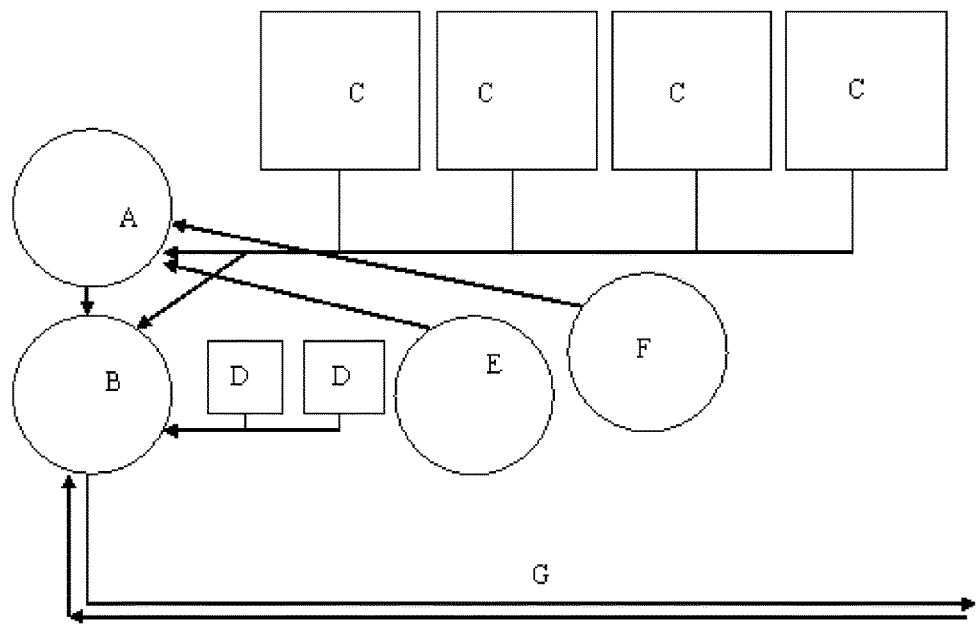
FIG. 10 is a schematic representation of a setup with fermentation and mixing tank according to an embodiment of the invention.
Figure 11:
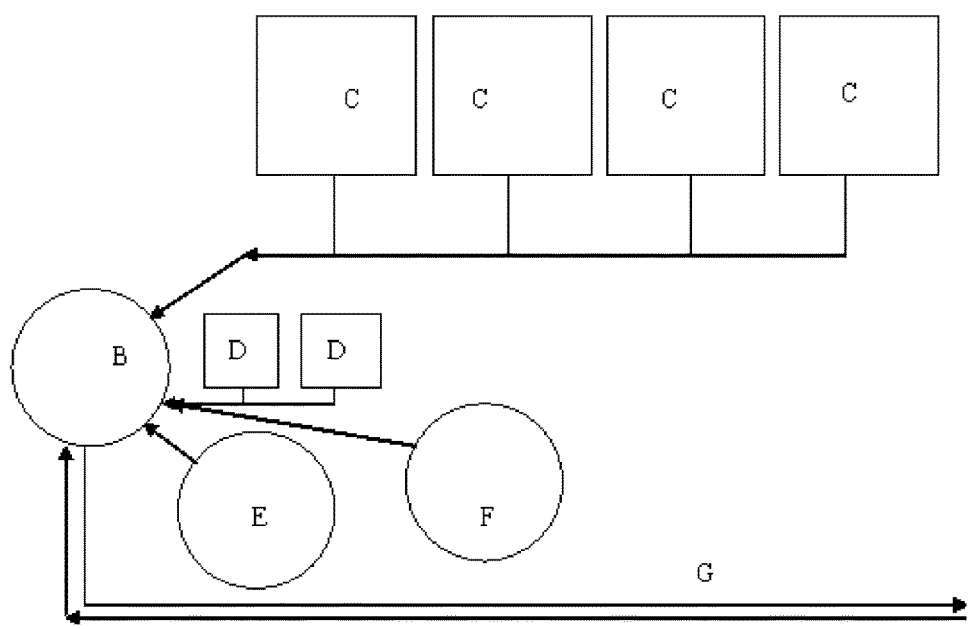
FIG. 11 is a schematic representation of a setup with fermentation tank according to an embodiment of the invention.
Figure 12:
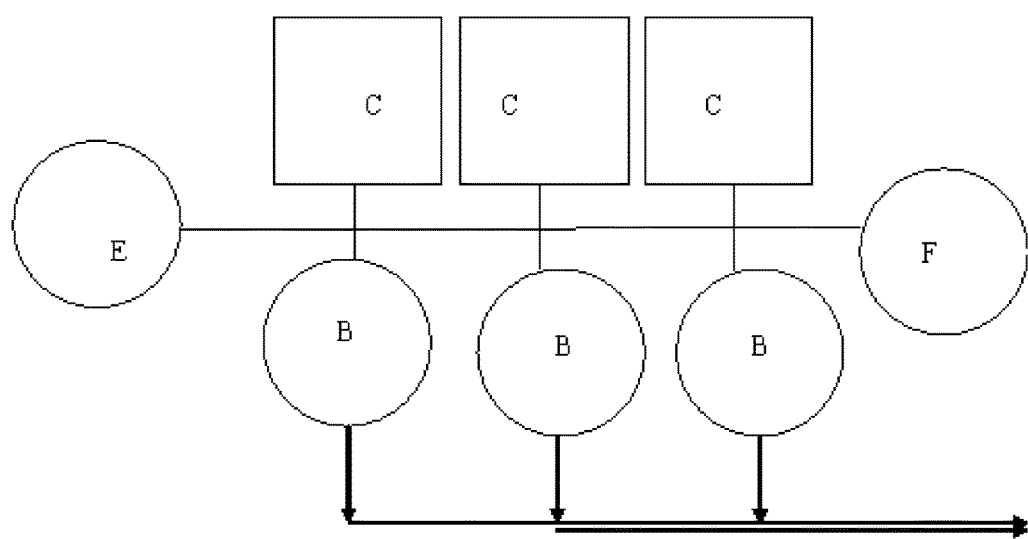
FIG. 12 is a schematic representation of a setup with several fermentation tanks according to an embodiment of the invention.

FIGS. 10-12 illustrated 3 different home mixer feed systems, suitable for providing a fermented mixed feed product. Routinely, fermentation of the feed product to be fermented will be finished after about 6 h at between 20-25° C., preferably around 23° C. A home mixer feed system can comprise several of the following components:

A) Fermentation tank A which will weigh ground mixture of any fermented product, feed and water from C, F and E. Commonly, there will be taken from 5-70% fermented product from F. After about 6 hours at ±23° C., the fermentation will be finished. However, temperatures ranging from 15° C. to 45° C. can also provide fermentation). Commonly, the size of the fermentation tank A is from 1.000 kg, upwards.

B) Mixing feeding and fermentation tank B, mixing content from A (if installed), C, D and E. Commonly, the size of mixing tank B is ranging from 500 kg to 12000 kg. Fermented mixed feed is best used fresh, or within 24 h. If fermented grain is standing too long after fermentation (e.g. two or more days), the fermented feed product can turn bitter, presumably due to the high level of minerals in the grain and other chemical reactions.

C) One or more tanks C containing feed product to be fermented. Commonly, they contain grain, such as wheat and barley, as well as soy. Often, the feed product to be fermented is not heat treated and not sterile.

D) Vitamins and minerals containers D. These components can be provided as one or more mixtures, or individually. They can be provided in bulk or big bags. Mostly, dry components (powder, pellets and the like) are used, but they can also be liquid. Commonly, amino acids are added after the fermentation process, in order to avoid degradation, decomposition and/or destruction of the amino acids.

E) Clean soft water tank E, providing water at 20-25° C., preferably around 23° C. The water temperature can also be different from room temperature, e.g. lower than or at around ground temperature. This is not uncommon, if water from tank E is added into fermentation tank B. Water is checked for minerals, and if necessary, adjusted and/or cleaned to obtain the best growth for the lactic acid bacteria. The water tank E can have any capacity, ranging from very small to very large. Alternatively, water is provided directly from a tap. A heat-exchanger can be installed to heat up the water if necessary.

F) Tank for fermented product with lactic acid bacteria. Often, the capacity of fermented product tank F is from 1000 kg, upwards. Normally, the fermented product remains active and usable for a storage time of up to 2 weeks. Commonly, the tank is emptied and cleaned before filling with a new batch of fermented product. The tank can be provided with a zip system to facilitate emptying and cleaning. Alternatively, the tank is emptied and cleaned by conventional means.

G) Feeding pipes G bringing the feed to the different sections in the pig house. Feeding pipe G can be several 100 m long, and they can reach length of 1 km or more. Depending on the age of pigs they need different energy and mineral levels in the feed. Therefore there can be several lines of different pipes, e.g. one for each section, or one main pipe where the feed in the pipe is mixed with the new blended feed, so all the pigs get the same type of feed. It can also be a pipe, where the feed is emptied with water. Feeding pipe G can be a return pipe, where a fraction of the feed is returned to the fermenting tank B. It can also be a one-way pipe. Different sections of the stables can have individual feeding pipes.

System 1

FIG. 10 shows an embodiment of the current invention with a liquid feeding system comprising a fermentation tank A and a fermentation/mixing tank B. Feeding pipe G can return the liquid fermented mixed feed into fermenter B.

System 2

FIG. 11 shows another embodiment of the current invention with a liquid feeding system comprising a fermentation/mixing tank B, but without fermentation tank A. Feeding pipe G can return the liquid fermented mixed feed into fermenter B; alternatively, the mixed feed is transported only one way. All feed components are mixed in tank B. Generally, amino acids from tank D are added towards the end of fermentation, preferably before feeding. Also water (preferably 23° C., but also cold groundwater) can be added to fermenter B.

System 3

FIG. 12 shows an alternative embodiment of the current invention. The liquid feeding system comprises several fermentation tanks A, where water from E, the fermented liquid fermented food from F and the feed product to be fermented (C) can be provided individually to several parallel fermenters A.

Example 5

Feeding Trials with Different Ratios of Liquid Fermented Product:Feed Product to be Fermented The results of feeding trials using different liquid fermented products and different home mixer feed systems are presented below. The results are based on experiments conducted at 19 different pig farms in Europe.

Fifteen farmers used fermented potatoes as inoculum for fermentation of feed products for pig production. Fourteen sites were in Jutland, Denmark, and 1 site was located in Wasa, Finland. Three sites had a home mixer feed systems 1 (FIG. 10), 11 sites had a home mixer feed system 2 (FIG. 11), and 1 site had a home mixer feed system 3 (FIG. 12).

The feeding trials were performed on sows, weaners and finishers, and typically, the pigs weight ranged from ~7 to ~200 kg.

Generally, the farms were comparatively large, and had more than 250 animal units per farm or more (1 animal unit equals approximately 32 finisher pigs per year from 30 to 107 kg live weight).

On three farms, fermented whey was tested. The sites were in the southern part of UK; Wasa, Finland; and Jutland, Denmark, respectively. All three farms possessed a home mixer feed system 2 without fermentation tank A (FIG. 11).

On one site on Zealand, Denmark (home mixer feed system 1, FIG. 10), feeding pigs with fermented spent grain from beer production and fermented molasses was tested. This trial was only conducted with finishers.

The liquid fermented product used was fresh potato peals from a potato factory. Commercially available lactic acid bacteria starter cultures, either "PIG stabilizer 317" (Medipharm, Sweden), or "Pig Stabiliser 400" (Lactosan, Austria) were added in the factory after the pealing machine, where the temperature was about 38° C. Approximately 3 g lactic acid bacteria were added per 1000 kg of potato peals. The dry matter content was about 12.5 to 16%. The potato peals were pumped to a storage/fermentation tank made of fiberglass, with a capacity of around 50 m$^3$ without stirring. In the factory, where the lactic acid bacteria were sprayed onto the potato peals, the temperature was 38° C. When the peals arrived into the storage tank the temperature dropped to about 35° C. and kept for 24 hours. After fermentation in the storage tank, solanine from the potatoes destroyed. Furthermore, the digestibility of the potato peals was increased compared to non-fermented potato peals (data not shown).

The fermented potato peals (=liquid fermented product) was transported to the locations in a tank lorry, and transferred/pumped into tank F at the different test sites.

The fermented mixed feed was freshly fermented and used within 24 hours after fermentation. Generally, it consisted of grains and soy. All feeding rations comprised mainly wheat, barley and soy. The maximum soy content was 23% of total. In 14 rations wheat was the dominant ingredients used from 40% to 75% of total. In 1 ration, barley was the dominant ingredient.

In the fermentation tank (tank A) the dry matter content was from 29 to 32% as the distance to pump it to tank B was always less than 10 meters. The dry matter content in tank B was from 24% to 27% depending on the distance to pump the feed inside the pig house.

Generally, feeding trials with fermented mixed feed were performed on the whole pig stock. The results presented below are based on a comparison of performance data prior to installation of the home mixer feed systems, and after installation and feeding with fermented mixed feed.

Results

The feeding trial results are summarized in Table I below:

TABLE I

Results from feeding trials

| Mixture | Condition 1 | Condition2 |
|---|---|---|
| % inoculum (liquid fermented product) | low microbial pressure (no pigs had been kept in stables proir to feeding experiment) | high microbial pressure (pigs had been kept in stables prior to feeding experiment) |
| 5% | 2 trials were perfect (*) 1 trial negative (**) | 1 trial was perfect 2 trials were negative |
| 10% | 3 trials were perfect | 2 trials were perfect 2 trails were negative |
| 30% | 3 trials were perfect | 3 trials were perfect 1 trail was negative |
| 40% | 3 trials were perfect | 3 trials were perfect |

(*) "Perfect" indicates that pigs were eating very rapidly, and they were eating essentially all the feed provided to them, and quicker than before (i.e. conventional feeding without provision of liquid fermented mixed feed). Daily weight gain was either as before or increased, e.g. at 0-50 g per day. If 900 gram daily gain was achieved before starting the feeding trials, daily weight gain increased from 900-950 g per day. No or little diarrhea was observed, requiring no medicine/antibiotics. Furthermore, the feed conversion ratio (FCR) was reduced by approximately 0.2 compared to before the feeding trial. FCR, also called feed conversion efficiency (FCE), is a measure of an animal's efficiency in converting feed mass into increased body mass.

Specifically FCR is the mass of the food eaten divided by the body mass gain, all over a specified period of time. FCR is dimensionless. Animals that have a low FCR are considered efficient users of feed.

(**) "Negative" indicates that the pigs did not want to eat the estimated amount of feed given to them. By visual inspection it could be seen that pigs suffered from diarrhea (more than 20%), and that the pigs did not grow well (estimated 20 to 60 g less weight increase per day). If 900 gram daily weight gain was achieved before feeding with fermented mixed feed, daily weight gain dropped to 840-880 gram daily. As a result, antibiotics had to be used for treating stomach problems. Thereby acceptable weight gains could be reestablished.

It is clear that type and microbial pressure in the surroundings (house, farm, etc.) where the fermentation is done, has a great influence on the amount of liquid fermented product needed to be added to the feed product to be fermented, in order to provide a successful and reliable fermentation. Higher microbial pressures require higher inoculum of liquid fermented product.

It is a known problem that the feeding line G cannot be cleaned adequately. The feeding line comprises e.g. a lot of rubber valves, which are difficult to access and which cannot be cleaned, and which often results in infection and growth of yeast. This risk is increased in feeding lines, where feed from the feeding pipe G is returned in to the fermenter, which may comprise acid tolerant (and undesired) yeast. However, when using 30% or more of liquid fermented product as incoculum, this problem can be avoided, as feeding with fermented mixed product according to the invention proved successful. Generally, in new houses/stables there was no built up of yeast was observed and feeding trials were successful.

Smaller pigs were more sensitive against taste of the feed (data not shown).

The fermentation tank has little influence on the fermentation. No differences were observed between the different liquid feeding systems or brands thereof.

Fermenter systems supplied by Funky (Hammerum near Herning, Denmark), Skiold (Ikast, Denmark) and Big Dutchman (Vejen, Denmark) were used with success. Funky and Big Dutchman tanks are made from glass fiber. Two of the tanks from Skiold are made from stainless steel, and one from glass fiber. All the feeding tanks (B) were made from glass fiber and the sizes varied from 5 to 8000 liters.

Likewise, rotation speeds of the mixing means used during fermentation were found not to be critical. The mixing/stirring systems used were those provided with the fermentation tanks. Different rotation speed, ranging from about 35 rpm to about 250 rpm were used, without observing differences in the final results.

The starter cultures "PIG stabilizer 317" and "Pig Stabiliser 400" comprised rapidly acidifying, homofermentative strains of lactic acid bacteria (*Pediococcus pentosaceus* HTS (LMG P-22549), *Pendiococcus acidilactici* NCIMB 30086 and *Lactobacillus plantarum* LSI (NCIMB 30083); *Enterococcus fascium* NCIMB 30122, *Lactobacillus rhamnosus* NCIMB 30121) that were able to produce a lot of lactic acid within a short time. It has proven earlier that the inoculum can produce amounts of lactic acid exceeding 160 mM. It is also important to use a strain with good palatability for the pigs. In general, it was important that the right strain of lactic acid was used, to obtain a rapid drop in pH under pH 4.0. Thereby, a preservation of the feed is obtained and destruction of amino acids is reduced. No differences were noticeable between the two starter cultures used.

The fermented feed product and its composition were found not to be of great importance. There were no differences in the observed results, regardless if barley or wheat was the dominant ingredients. However, the amount of soy in the feed product had an influence on pH and lactic acid. A higher amount of Soy used as more lactic acid. Interestingly, an increase of 15% in digestibility of soy was observed, when feeding with fermented mixed feed comprising soy.

In conclusion, feeding pigs with a fermented mixed feed provides the following benefits (this list is not to be construed as to be limiting for the invention):

higher feed intakes for the pigs
better palatability of the feed
higher growth rates of the pigs
improved nutritional value of the feed—the nutritional value of the fermented mixed feed is higher than the nutritional values of the liquid fermented product and the feed product to be fermented (without fermentation).

control/preservation of amino acids, avoiding degradation of the free amino acids. This was only obtained were 10% or more fermented products was added into the feed.

digestibility of soy protein was increased with about 15%.

use as growth promoter—improved or perfect stomach health reduced or removed the need for medicine against *E. coli, Salmonella* and/or Lawsonia diarrhea.

improved stomach health through fermented mixed feed—this allows for selecting and using grain/feed which is cheaper.

robust pigs—pigs are less sensitive towards change in feed financial benefits—reduced medical expenses, reduced expenses for feed, increased weight gain of the pigs.

robust and reliable liquid feeding system—feeding animals with fermented mixed feed is now feasible, where previous systems sometimes or often failed. The system is farmer friendly, and manageable in an environment with high microbial and/or bacterial pressure.

Undesired growth of yeast in e.g. the feeding pipe G can be avoided. In contrast to natural fermentation systems, the microbial flora can be controlled. Furthermore, the system does not require sterile or near-sterile conditions, adding to its reliability and robustness. Due to the use of the liquid fermented product as inoculum, which comprises a high number of active bacteria, active bacteria are added to the feed product to be fermented. This reduces the lag-phase of the fermentation, resulting in a rapid production of lactic acid and reduction of pH.

Example 6

Preparation of a Mixed Fermented CCM Silage

A mixed fermented product produced according to Example 5, obtained by fermenting a mixture of 50% wheat, 40% barley with 10% soy, was pumped into 12 1000 liter pallets containers made of plastic. The pallet containers were stored at ambient temperature without any stirring for up to 1 week. Over a period of 2 weeks, newly combined CCM maize was inoculated with the mixed fermented product by pumping and spraying the mixed fermented product onto the CCM maize, while it was transported via an auger into the storage silo. The storage silo was a conventional upright standing 1200 t airtight silo, presumably made of coated steel (brand unknown). The auger was about 15 m long with a diameter of around 200 mm. The ratio of mixed fermented product:CCM maize was approximately 1-2%. The silo was filled within 14 day with CCM maize inoculated with the fermented mixed product and closed.

After approximately 6 month, the silo was opened and the now fermented CCM was emptied using an auger. A sample of ~0.5 l was removed, and the sample was send to an analytical laboratory. Analysis revealed low levels of acetic acid (10.5 mM), and a lactic acid concentration of 110 mM.

The fermented CCM was used in one of the feeding trials described in Example 5, and was labeled "perfect". It is a known problem that pigs do not like acetic acid. However, the levels of lactic acid were so low that it was possible to feed pigs (~30 kg body weight) with the fermented CCM, as they were not reluctant to eat the fermented CCM.

Conventional CCM-based silage are known to have varying levels of acetic acids, commonly ranging between for example 20-200 mM acetic acid or more. These variations are assumed to be caused by the water content of the CCM maize during harvest and the microbial flora present during fermentation.

The example presented above demonstrates that a mixed fermented product based on fermented CCM maize can be produced, and the CCM maize ensilage is suitable for feeding monogastric animals such as pigs.

What is claimed is:

1. A method of preparing a fermented mixed feed, wherein said method comprises the steps of:
    (a) providing a liquid fermented product comprising mature or immature plants or parts thereof, wherein the liquid fermented product has a pH of 4.2 or lower, wherein the liquid fermented product comprises lactic acid producing bacteria, and wherein the lactic acid producing bacteria comprise a strain selected from the group consisting of lactic acid producing bacteria of the genus *Enterococcus, Lactobacillus, Pediococcus* and *Lactococcus*;
    (b) providing a feed product to be fermented, wherein the feed product comprises plants or parts thereof;
    (c) combining the products from step (a) and (b);
    d) reducing to a pH of between 4.2 to 3.5 in 24 hours by fermenting the feed product of step (b) using the liquid fermented product of step (a) as inoculum; and
    (e) generating a fermented mixed feed having a lactic acid concentration above 100 mM, wherein the amount of acetic acid in the fermented mixed feed is 20 mM or lower.

2. The method according to claim 1, wherein the lactic acid producing bacteria comprise one or more of *Enterococcus faecium, Lactobacillus rhamnosus, Lactobacillus plantarum, Pediococcus acidililactili,* or *Pediococcus pentosaceus*.

3. The method according to claim 1, wherein the feed product provided in step (b) comprises one or more of barley, wheat, rye, oat, maize, rice, beans, peas, sorghum, triticale or soy.

4. The method according to claim 1, wherein step (c) is conducted at a temperature of between 20-25° C.

5. The method according to claim 1, wherein the liquid fermented product comprises one or more of whey, curd, spent grain, yeast, fungus, mold, bacteria, mature or immature corn, potato peels or potato.

6. A method of preparing a fermented mixed feed comprising:
    (a) providing a liquid fermented product comprising mature or immature plants or parts thereof, wherein the pH of the liquid fermented product is 4.2 or lower and, wherein the liquid fermented product comprises lactic acid producing bacteria;
    (b) providing a feed product to be fermented, wherein said feed product comprises plants or parts thereof and yeast;
    (c) combining the products from step (a) and (b) and fermenting the feed product of step (b) to a pH of 4.2 or lower within 24 hours; and
    (d) generating a fermented mixed feed having a lactic acid concentration above 100 mM, wherein the amount of acetic acid in the fermented mixed feed is 20 mM or lower.

7. The method of claim 6, wherein the lactic acid producing bacteria comprise a combination of *Pediococcus acidilactici, Pediococcus pentosaceus,* and *Lactobacillus plantarum*.

8. The method according to claim 1, wherein the ratio between lactic acid to acetic acid is 20:1 or more in the provided fermented mixed feed in step d).

9. The method according to claim 1, wherein the method is a method of preparing a fermented mixed feed for monogastric animals.

10. The method according to claim 1, wherein the method is a method of preparing a fermented mixed pig feed.

11. The method according to claim 1, wherein the method is for preparing a batch of fermented mixed feed.

12. The method according to claim 1, wherein the method is not a continuous method for preparing a batch of fermented mixed feed.

13. The method according to claim 1, wherein the lactic acid producing bacteria comprise a combination of *Pediococcus acidilactici, Pediococcus pentosaceus*, and *Lactobacillus plantarum*.

* * * * *